US010502160B2

(12) United States Patent
Nakano et al.

(10) Patent No.: US 10,502,160 B2
(45) Date of Patent: Dec. 10, 2019

(54) REVERSE THRUST ENGINE

(71) Applicant: General Electric Company, Schenectady, NY (US)

(72) Inventors: Tsuguji Nakano, West Chester, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 731 days.

(21) Appl. No.: 15/018,893

(22) Filed: Feb. 9, 2016

(65) Prior Publication Data

US 2017/0226960 A1   Aug. 10, 2017

(51) Int. Cl.
  *F02K 1/66*  (2006.01)
  *F02K 1/68*  (2006.01)
  *F02K 1/76*  (2006.01)
  *F02K 1/64*  (2006.01)
  (Continued)

(52) U.S. Cl.
  CPC .................. *F02K 1/68* (2013.01); *F01D 1/30* (2013.01); *F01D 7/00* (2013.01); *F02K 1/64* (2013.01); *F02K 1/66* (2013.01); *F02K 1/766* (2013.01)

(58) Field of Classification Search
  CPC . F02K 1/56; F02K 1/563; F02K 1/566; F02K 1/58; F02K 1/60; F02K 1/605; F02K 1/62; F02K 1/625; F02K 1/64; F02K 1/66; F02C 7/04; F02C 7/042; F01D 7/00; B64D 29/00; B64D 29/02; B64D 2033/0286
  See application file for complete search history.

(56) References Cited

U.S. PATENT DOCUMENTS 2,746,671 A * 5/1956 Newcomb ................. F01D 3/00
                                                 415/104
3,476,486 A * 11/1969 Chilman ................... F01D 7/00
                                                 415/129

(Continued)

FOREIGN PATENT DOCUMENTS

| CN | 101368511 A | 2/2009 | |
| CN | 104937251 A | 9/2015 | |
| GB | 2070691 A * | 9/1981 | ............... F02K 1/66 |

OTHER PUBLICATIONS

Extended European Search Report and Opinion issued in connection with corresponding EP Application No. 17154880.3 dated Jun. 7, 2017.

(Continued)

*Primary Examiner* — Gerald L Sung
*Assistant Examiner* — Marc J Amar
(74) *Attorney, Agent, or Firm* — Dority & Manning, P.A.

(57) ABSTRACT

A propulsion device that defines a central axis and a circumferential direction is provided. The propulsion device may include a core engine and a core casing. The core engine may include an engine shaft extending along the central axis. The core casing may have an inner surface and an outer surface. The core casing may extend along the circumferential direction about the propulsion device, as well as along the central axis from a forward end to an aft end. The core casing may define a primary air flowpath having an annular inlet at the forward end and an exhaust at the aft end. The core casing may further define a reverse flow passage extending from an outer surface entrance to an inner surface exit.

20 Claims, 3 Drawing Sheets

(51) Int. Cl.
 *F01D 7/00* (2006.01)
 *F01D 1/30* (2006.01)

(56) References Cited

U.S. PATENT DOCUMENTS

| | | | | |
|---|---|---|---|---|
| 3,487,880 | A | * | 1/1970 | Chilman .................. F01D 7/00 416/157 R |
| 3,589,132 | A | * | 6/1971 | Du Pont ................. F02K 3/105 60/262 |
| 3,729,934 | A | * | 5/1973 | Denning .................. F02K 1/66 60/226.2 |
| 3,820,719 | A | | 6/1974 | Clark |
| 3,897,001 | A | * | 7/1975 | Helmintoller, Jr. ....... F02K 1/08 239/265.13 |
| 4,005,574 | A | * | 2/1977 | Smith, Jr. ................ F02K 1/66 60/226.2 |
| 4,047,911 | A | * | 9/1977 | Krojer ...................... F02C 7/05 55/306 |
| 4,055,042 | A | * | 10/1977 | Colley ..................... F02K 3/06 60/226.1 |
| 4,371,132 | A | * | 2/1983 | Woodward ............... F02K 1/72 244/110 B |
| 5,343,696 | A | | 9/1994 | Rohra et al. |
| 6,286,784 | B1 | | 9/2001 | Hardy et al. |
| 8,468,796 | B2 | | 6/2013 | Emprin et al. |
| 8,660,771 | B2 | | 2/2014 | Jegu et al. |
| 2014/0116025 | A1 | | 5/2014 | Todorovic |
| 2016/0017752 | A1 | * | 1/2016 | Coffin .................... B64D 29/06 475/331 |
| 2018/0135557 | A1 | * | 5/2018 | Pouyau ................... F02K 3/075 |

OTHER PUBLICATIONS

Machine Translation and Notification of Reasons for Refusal issued in connection with corresponding JP Application No. 2017-019234 dated Mar. 6, 2018.

First Office Action and Search issued in connection with corresponding CN Application No. 201710070769.4 dated Apr. 4, 2018.

Japanese Office Action Corresponding to JP Application No. 2017019234 dated Jan. 22, 2019.

* cited by examiner

REVERSE THRUST ENGINE

FIELD OF THE INVENTION

The present subject matter relates generally to engines, and more particularly, to rotating engines wherein the airflow through at least a portion of the engine is reversible.

BACKGROUND OF THE INVENTION

In some fan engines (e.g., "propfan" engines), an axis of a rotating propeller is parallel to or coaxial with an axis of the gas engine. In some such engines, the propeller may have a fixed pitch or a variable pitch. Certain variable pitch gas turbine engines include a thrust reverse feature for redirecting a flow of air through or around the engine to generate a reverse motive force or thrust. Generally, in order to generate a reverse thrust, the pitch of the propellers is rotated such that air is drawn from a rearward or aft portion of the engine. As the propellers rotate about a central axis, the reverse flow air provides thrust in a direction opposite of a normal operation, i.e., from aft to forward instead of the normal forward to aft. During reverse thrust, air is forced around the engine before it is drawn into a typical forward inlet of a core engine compressor. Upon entering the compressor inlet, air flows in a relatively normal direction, i.e., from forward to aft. Although air is provided into a typical location (the compressor inlet) during reverse thrust, significant and undesired swirl or flow distortion may be introduced into the airflow. Moreover, since most engines are primarily designed for normal flow (forward to aft), existing engines are typically only streamlined in that direction. Various support elements or the inlet to the engine may cause aft to forward airflow to swirl, detrimentally affecting the compressor's performance, as well as performance of the whole engine.

Accordingly, an improved reversible gas turbine engine is desired. In particular, a gas turbine engine that reduced the amount of flow distortion introduced into reversed airflow would be advantageous.

BRIEF DESCRIPTION OF THE INVENTION

Aspects and advantages of the invention will be set forth in part in the following description, or may be obvious from the description, or may be learned through practice of the invention.

In one aspect of the present disclosure, a propulsion device is provided that defines a central axis and a circumferential direction. The propulsion device may include a core engine and a core casing. The core engine may include an engine shaft extending along the central axis. The core casing may have an inner surface and an outer surface. The core casing may extend along the circumferential direction about the propulsion device, as well as along the central axis from a forward end to an aft end. The core casing may define a primary air flowpath having an annular inlet at the forward end and an exhaust at the aft end. The core casing may further define a reverse flow passage extending from an outer surface entrance to an inner surface exit.

In another aspect of the present disclosure, an engine is provided that defines a central axis. The engine may include a fan section, a core engine, and a core casing. The fan section may include a plurality of variable pitch fan blades for generating a forward thrust and a reverse thrust. The core engine may be drivingly connected to the fan section. The core casing may enclose the core engine and at least partially defining a primary air flowpath through the core engine. The core casing may extend along the central axis from a forward end to an aft end. The core casing may also define an annular inlet to the primary air flowpath at the forward end and a reverse flow passage extending through the core casing to the primary air flowpath to allow a flow of air therethrough when the variable pitch fan blades generate a reverse thrust.

In yet another aspect of the present disclosure, a method of operating a propulsion device is provided. The propulsion device may include a fan section with a plurality of variable pitch fan blades for generating a forward thrust and a reverse thrust, a core engine drivingly connected to the fan section, and a core casing. The method may include generating reverse thrust utilizing the fan section such that air flows through a reverse flow passage. The reverse flow passage may be defined through the core casing. The core casing may enclose the core engine and at least partially defines a primary air flowpath through the core engine. The core casing may also extend along the central axis from a forward end to an aft end. The core casing may further define an annular inlet to the primary air flowpath at the forward end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
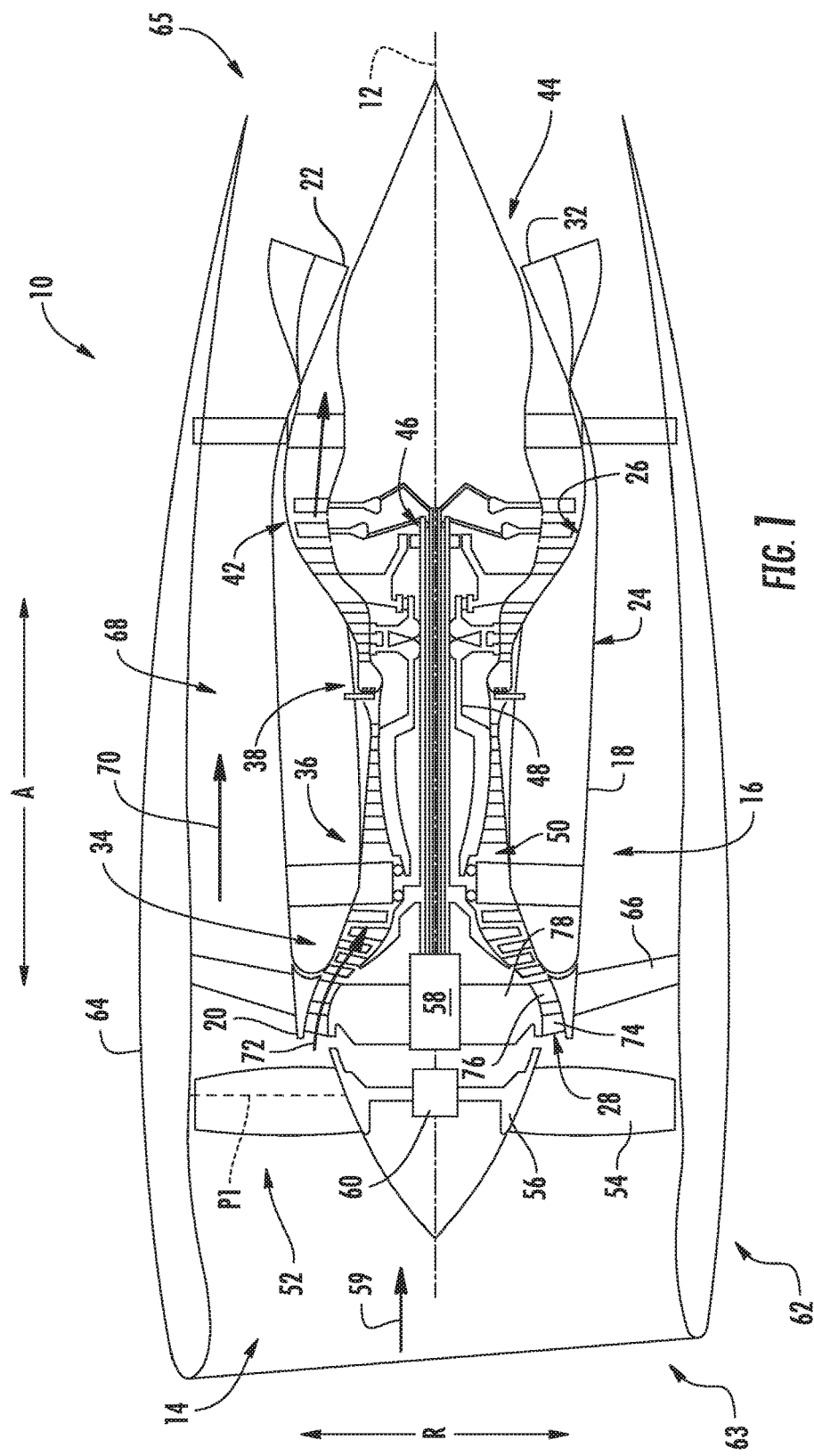
FIG. 1 provides a cross-sectional, schematic view of an exemplary gas turbine engine in accordance with one or more embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The current disclosure provides generally for a gas turbine engine configured for reversible airflow. Among other features, the gas turbine engine may be configured to generate a flow of a reverse airflow directly into the core engine without having to pass air exclusively through a central core inlet.

Turning now to the figures, FIG. 1 illustrates a propulsion device, formed as a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending forward to aft parallel to a longitudinal central axis 12, provided for reference) and a radial direction R. The turbofan engine 10 may also define a circumferential direction C (see FIG. 3) extending circumferentially about the axial direction A. In general, the turbofan 10 includes a fan section 14 and a core engine 16 disposed downstream from the fan section 14. Although a turbofan engine 10 having a core turbine engine 16 is illustrated, it is envisioned that another propulsion device may be provided. Specifically, a propulsion device having another suitable core engine may be provided. For instance, an electric motor, hydrogen fuel cell, nuclear engine, or another suitable engine for providing rotational force to an engine shaft and fan may be provided as an additional or alternative core engine embodiment.

The exemplary core engine 16 depicted is generally enclosed within a substantially tubular outer casing, or core casing 18. As illustrated, the core casing 18 extends along the central axis 12 from a forward end 20 to an aft end 22, and includes a radially outward-facing outer surface 24 and a radially inward-facing inner surface 26. Moreover, the core casing 18 defines an annular core inlet 28 at the forward end 20 and a jet exhaust 32 at the aft end 22. The outer or core casing 18 is circumferentially disposed about and encases, in serial flow relationship, a compressor section including a rotating booster or low pressure (LP) compressor 34 and a high pressure (HP) compressor 36; a combustion section 38; a turbine section including a high pressure (HP) turbine 40 and a low pressure (LP) turbine 42; and a jet exhaust nozzle section 44. In the illustrated embodiment, each of the LP compressor 34, the HP compressor 36, the HP turbine 40, and the LP turbine 42 extend radially outward from the central axis 12. A high pressure (HP) engine shaft or spool 46 extends along the central axis 12 and drivingly connects the HP turbine 40 to the HP compressor 36. A low pressure (LP) engine shaft or spool 48 also extends along the central axis 12 and drivingly connects the LP turbine 42 to the LP compressor 34. The compressor section, combustion section 38, turbine section, and nozzle section 44 together define a primary or primary air flowpath 50 therethrough.

For the embodiment depicted, the fan section 14 includes a variable pitch fan 52 having a plurality of fan blades 54. The fan blades 54 are attached at a base to a disk 56, the fan blades 54 and disk 56 together rotatable about the longitudinal central axis 12 by the LP shaft 48 across a power gear box 58, as illustrated in FIG. 1. In optional embodiments, the power gear box 58 includes a plurality of gears for stepping down a rotational speed of the LP shaft 48 to a more efficient rotational fan speed. However, in other embodiments, the fan blades 54 and disk 56 may be driven direction by the LP shaft 48.

Additionally, the plurality of fan blades 54 are each rotatable about a respective pitch axis P1 by a pitch change mechanism 60. The pitch change mechanism 60 may include one or more rotary or linear actuators for changing a pitch of each of the respective fan blades 54. In at least one pitch position, the fan blades 54 may act to reverse airflow about the core engine 16, described in greater detail below.

Referring still to the exemplary embodiment of FIG. 1, the disk 56 is covered by rotatable front hub aerodynamically contoured to promote an airflow through the plurality of fan blades 54. Additionally, the exemplary turbofan engine 10 includes an annular nacelle assembly 62 that circumferentially surrounds the fan 52 and/or at least a portion of the core engine 16. The nacelle assembly 62 generally includes a fan cowl 64. The exemplary nacelle 62 depicted is supported relative to the core engine 16 by a plurality of circumferentially-spaced outlet guide vanes 66. Generally, the outlet guide vanes 66 may be sized, shaped, and configured to reduce swirl to the fluid or air flowing forward to aft. During normal operations, the fluid or air has a greatly reduced degree of overall swirl, which translates to an increased level of engine efficiency. In the illustrated embodiment, a bypass airflow passage 68 is defined between the nacelle assembly 62 and the core engine 16.

During normal operation of the turbofan engine 10, the plurality of fan blades are configured to generate a forward thrust. More particularly, a volume of air 59 enters the turbofan 10 through an associated cowl inlet 63 of the nacelle 62 and/or fan section 14. As the volume of air 59 passes across the fan blades 54, a first portion of the air, as indicated by arrows 70, is directed or routed into the bypass airflow passage 68 and out through the bypass exhaust 65. A second portion of the air, as indicated by arrow 72, is directed or routed into the primary air flowpath 50 to exit at the jet exhaust 32.

Figure 2:
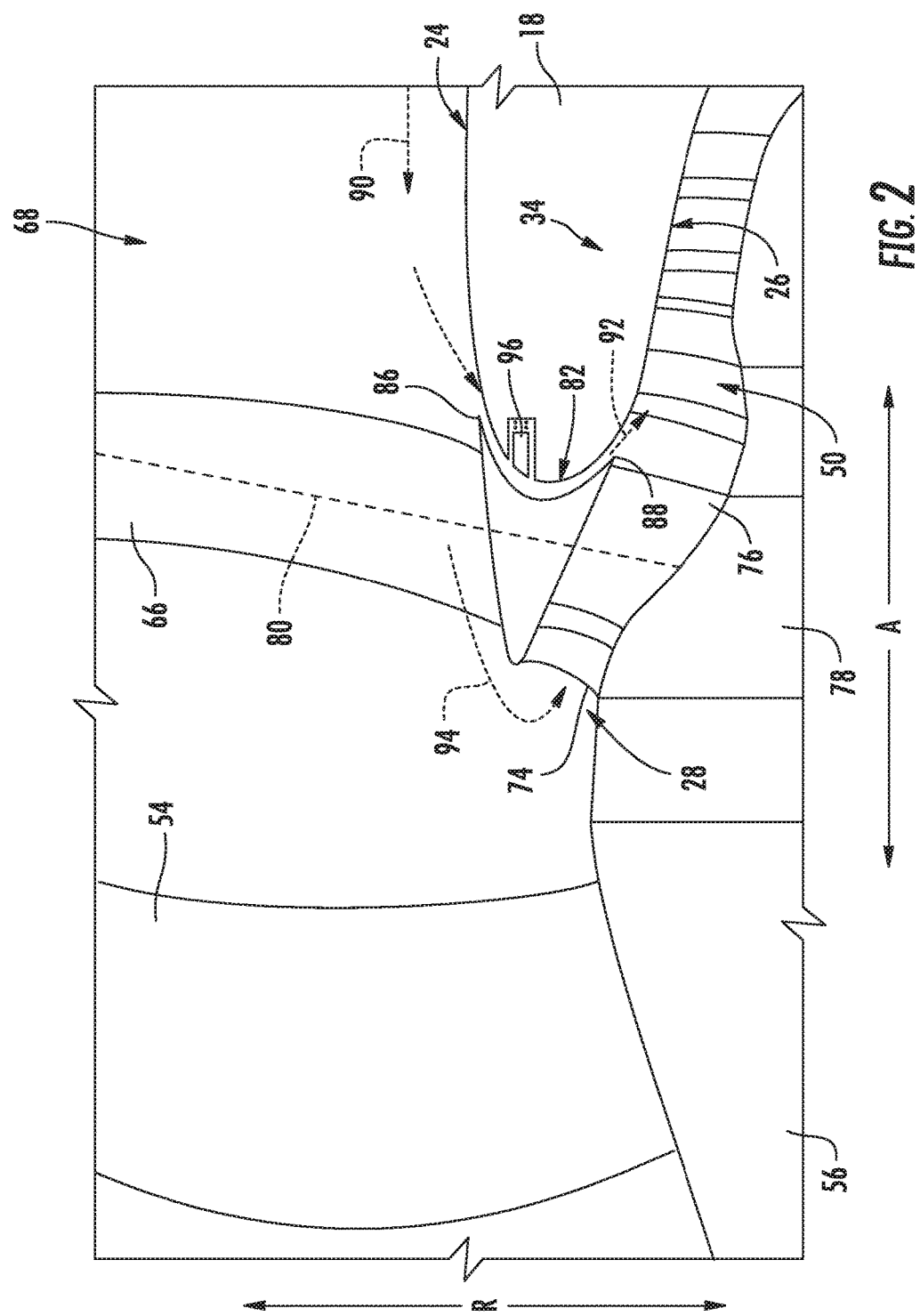
FIG. 2 provides a magnified cross-sectional, schematic view of the exemplary gas turbine engine of FIG. 1.

Referring now to FIG. 2, a magnified view of a portion of the exemplary gas turbine engine 10 of FIG. 1 is provided, including the compressor portion. As shown, a nozzle, including plurality of fan exit stator vanes 74 is supplied at the annular core inlet 28 within the primary air flowpath 50 and forward from the LP compressor 34. Generally, the fan exit stator vanes 74 are disposed in an annular array about the central axis 12 (see FIG. 3) forward from the LP compressor 34 (see also, FIG. 3 wherein the footprints of several vanes 74 are indicated as dashed lines). The fan exit stator vanes 74 may be shaped and configured remove swirl from air blown by engine 10. In the exemplary embodiment of FIG. 2, the stator vanes 74 are secured to the core casing 18 in stationary relationship. Moreover, the stator vanes 74 of certain embodiments extend radially inward from the inner surface 26 of the core casing 18. Additional or alternative embodiments of the stator vanes 74 may be affixed or mounted to an internal stationary support 78 of the engine 10.

The illustrated embodiment of FIG. 2 further includes a plurality of core struts 76 disposed in an annular array about the central axis 12 (see FIG. 1). The core struts 76 are positioned aft of the annular inlet 28 and fan exit stator vanes 74, though there may be substantially fewer struts 76 than fan exit stator vanes 74. As shown, the core struts 76 extend radially inward from the inner surface 26 of the core casing 18. Optionally, the core struts 76 may be formed to have an airfoil shape to minimize the introduction of swirl in the primary air flowpath 50. In some embodiments, the core struts 76 also extend radially outward through the core casing 18 from the inner surface 26 to the outer surface 24. The core struts 76 generally support the core casing 18 from the stationary support 78. In optional embodiments, the core struts 76 may be further affixed or mounted to the stationary support 78 of the engine.

Certain embodiments of the gas turbine engine will include one or more core struts 76 that are axially-aligned with a bypass outlet guide vane 66. Optionally, each core strut 76 may be aligned with a different corresponding bypass outlet guide vane 66. As shown in FIG. 2, the core strut 76 and bypass outlet guide vane 66 of some embodiments extend radially to rigidly support the overall gas turbine embodiment. In illustrated embodiment, the core strut 76 and bypass outlet guide vane 66 are substantially axially and circumferentially aligned. Together, the core strut 76 and the bypass outlet guide vane 66 form a rigid radial support line 80 that extends from the fan cowl 64 (see FIG. 1) to the internal stationary support 78 of the engine.

Figure 3:
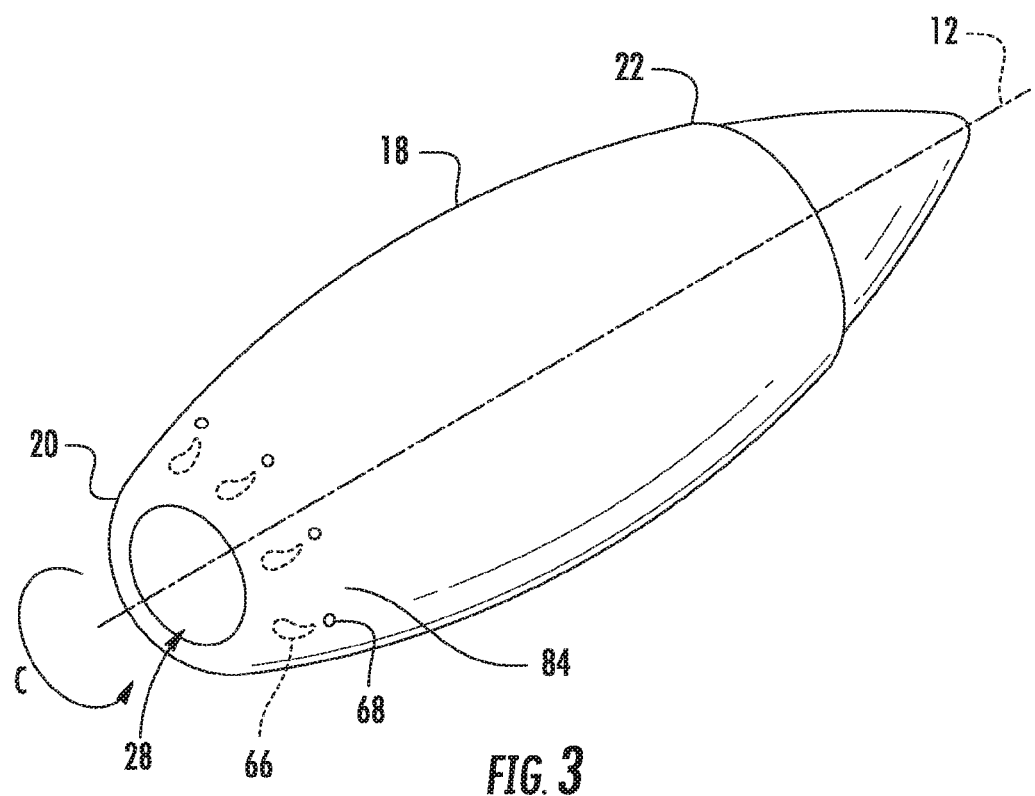
FIG. 3 provides a perspective view of an exemplary core engine casing in accordance with one or more embodiments of the present disclosure.

As shown in FIGS. 2 and 3, FIG. 3 providing a perspective view of the core engine 16, a reverse flow passage 82 is defined through the core casing 18 of the exemplary embodiments. Optionally, a plurality of reverse flow passages 82 may be disposed circumferentially about the central axis 12. Although the reverse flow passages 82 are shown to have a generally circular cross-section aperture, other suitable shapes may be provided. In the illustrated embodiment, the outer surface 24 of the core casing 18 is substantially uninterrupted with the exception of the reverse flow passages 82. A continuous strip 84 extends axially between each reverse flow passage 82, thereby minimizing detrimental swirl imparted to the bypass airflow by the core casing 18. In some such embodiments, the outer core casing 18 is formed as a single-piece cowling that extends continuously from the forward end 20 to the aft end 22. Although the core casing may be assembled from several constituent members, the constituent members may be directly attached to one another to form a substantially unitary structure, wherein each reverse flow passage 82 extends from an opening defined within the outer surface 24 to an opening defined within the inner surface 26.

As illustrated in FIG. 2, each reverse flow passage 82 generally extends in the radial direction R from the outer surface 24 of the core casing 18 to the inner surface 26 of the core casing 18. At least one outer surface entrance 86 is defined through the outer surface 24. Optionally, the outer surface entrance 86 may be partially or completely defined through the outlet guide vane 66. In some embodiments, at least one inner surface exit 88 is defined through the inner surface 26. In the exemplary embodiment of FIG. 2, the outer surface entrance 86 is positioned aft of the bypass outlet guide vane 66, while the inner surface exit 88 is positioned aft of the fan exit stator vanes 74. In certain embodiments, the inner surface exit 88 may be partially or completely defined through the strut 76.

As described above, during normal or forward-thrust operations, the fan blades 54 may draw air 58 (see FIG. 1) forward to aft around the core engine 16. However, as shown in FIG. 2, during reverse thrust operations, the fan blades 54 draw air, as indicated by arrows 90, aft to forward. In other words, reverse thrust operations will require air 90 to be drawn forward toward the fan blades 54 from an aft portion of the engine, e.g., the bypass exhaust 65 of FIG. 1. During reverse thrust operations, the reverse airflow 90 may split into multiple portions. One portion, indicated by the arrows 92, may be directed into the reverse flow passage 82. Another portion, indicated by the arrows 94, may travel further forward to the forward end 20 (see FIG. 1) of the core casing 18. In some embodiments, the airflow portion 92 may be directed from the bypass airflow passage 68 and downstream to the LP compressor 34. Specifically, airflow 92 may enter the outer surface entrance 86 before passing through the inner surface exit 88 into the LP compressor 34. Airflow 92 drawn through the outer surface entrance 86 during reverse thrust operations will be unaffected by detrimental swirl introduced at the bypass outlet guide vane 66. In certain embodiments, the inner surface exit 88 is positioned aft of the core strut 76. Advantageously, swirl introduced from the core strut 76 or any position forward from the core strut 76 will be similarly minimized during reverse thrust operations.

In some embodiments, the reverse flow passage 82 defines an arcuate flowpath through the core casing 18. As indicated in FIG. 2, the outer surface entrance 86 is directed toward an aft portion of the bypass airflow passage 68, e.g., the bypass exhaust 65 of FIG. 1. Thus, reverse airflow 90 may advantageously enter the reverse flow passage 82 with a relatively stable flow. Through the reverse flow passage 82, the arcuate flowpath progressively redirects airflow toward the direction of the primary air flowpath 50. In the illustrated embodiment, the inner surface exit 88 is directed toward the upstream LP compressor 34. Along with air drawn through the reverse flow passage 82, certain embodiments of the engine will also draw air, as indicated by arrows 94, from the annular core inlet 28 into the LP compressor 34 during reverse thrust operations. The airflow 92 from the reverse flow passage 82 may serve to render the airflow field substantially uniform for the airflow 94 from the annular core inlet 28.

The reverse flow passage 82 may be configured for passive or active use. Passive use embodiments will remain generally open at all times. For example, during normal engine operations, pressure difference across the reverse flow passage 82 may, generally, be insufficient to redirect significant portions of air from flowing forward to aft through the bypass airflow passage 68. By contrast, active use embodiments may include one or more mechanically-articulated or electronically-articulated active control plates 96 or other control valve structure to selectively block the reverse flow passage 82. For instance, a movable active control plate 96 may substantially obstruct the inner surface exit 88 during normal engine operations, while leaving the reverse flow passage 82 unobstructed during reverse thrust operations. One or more actuator may selectively force the active control plate 96 into or out of the reverse flow passage 82.

Optionally, a controller (not pictured) may be operably joined to the active control plate 96 to initiate movement thereof. The controller may include a discrete processor and memory unit. Optionally, the controller may include a full authority digital engine control (FADEC), or another suitable engine control unit. The processor may include a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. The processor may also include a microprocessor, or a combination of the aforementioned devices (e.g., a combination of a DSP and a microprocessor, a plurality of microprocessors, one or more microprocessors in conjunction with a DSP core, or any other such configuration).

Additionally, the memory device(s) may generally comprise memory element(s) including, but not limited to, computer readable medium (e.g., random access memory (RAM)), computer readable non-volatile medium (e.g., a flash memory, EEPROM, NVRAM or FRAM), a compact disc-read only memory (CD-ROM), a magneto-optical disk (MOD), a digital versatile disc (DVD), and/or other suitable memory elements. The memory can store information accessible by processor(s), including instructions that can be executed by processor(s). For example, the instructions can be software or any set of instructions that when executed by the processor(s), cause the processor(s) to perform operations. For certain embodiments, the instructions include a software package configured to operate the active control plate 96.

Methods are also generally provided for operating a propulsion device. Specifically, the propulsion device may include one or more embodiments described above. In some such embodiments, the method may include generating reverse thrust utilizing the fan section such that air flows through a reverse flow passage into a core engine. For instance, the variable pitch fan blades may be pivoted to a reverse-flow position and rotated to draw air forward toward the fan blades from an aft portion of the engine, e.g., a bypass exhaust. The fan may be driven by the connected core engine. At least a portion of the air may be drawn into the primary air flowpath of a core engine from the reverse flow passage. Another portion of the air is drawn into the primary air flowpath of the core engine from an annular inlet at a forward end of the core casing. Optionally, during normal flow, e.g., non-reverse thrust wherein air is propelled rearward toward an aft portion of an engine, a control plate may be actuated into the reverse flow passage, substantially preventing airflow therethrough.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion device defining a central axis and a circumferential direction, the propulsion device comprising:
   a core engine having an engine shaft extending along the central axis; and
   a core casing having an inner surface and an outer surface, the core casing extending along the circumferential direction about the propulsion device and extending along the central axis from a forward end to an aft end, the core casing defining a primary air flowpath having an annular inlet at the forward end and an exhaust at the aft end, the core casing further defining a reverse flow passage extending from an outer surface entrance to an inner surface exit, wherein the inner surface exit is defined through the inner surface, wherein the inner surface exit is defined aft of a core strut and forward of at least a portion of a low pressure compressor, wherein the outer surface entrance is defined through the outer surface and at least partially through a bypass outlet guide vane.

2. The propulsion device of claim 1, wherein the low pressure compressor is attached to the engine shaft, and wherein the core engine further comprises:
   a combustion section positioned downstream of the low pressure compressor to receive a compressed fluid from the low pressure compressor, and
   a turbine attached to the engine shaft and positioned downstream of the combustion section, the turbine configured to provide a rotational force to the compressor through the engine shaft.

3. The propulsion device of claim 1, wherein the reverse flow passage defines an arcuate flowpath through the core casing to direct air into the primary air flowpath at a location forward of the low pressure compressor.

4. The propulsion device of claim 1, wherein the core engine further defines a radial direction, wherein the core strut extends inward from the inner surface of the core casing along the radial direction, the core strut being positioned between the annular inlet and the inner surface exit along the central axis.

5. The propulsion device of claim 4, further comprising:
   a stator vane extending radially inward from the inner surface of the core casing, the stator vane being positioned between the annular inlet and the core strut along the central axis.

6. The propulsion device of claim 1, wherein the bypass outlet guide vane extends radially outward from the outer surface of the core casing, the bypass outlet guide vane being positioned between the forward end and at least a portion of the low pressure compressor.

7. The propulsion device of claim 1, wherein the core engine further defines a radial direction, wherein the core strut extends inward from the inner surface of the core casing along the radial direction, wherein the bypass outlet guide vane extends outward from the outer surface of the core casing along the radial direction, and wherein the bypass outlet guide vane is aligned with the core strut along the central axis to form a rigid radial support line.

8. The propulsion device of claim 3, further comprising:
   an active control plate attached to the core casing and positioned within the arcuate flowpath to selectively block air through the reverse flow passage.

9. The propulsion device of claim 3, further comprising:
   a plurality of reverse flow passages spaced along the circumferential direction.

10. The propulsion device of claim 9, wherein the core casing defines a continuous strip along the core casing between each reverse flow passage, and wherein each reverse flow passage extends from an opening defined within the outer surface to an opening defined within the inner surface.

11. An engine defining a central axis, the engine comprising:
    a fan section including a plurality of variable pitch fan blades for generating a forward thrust and a reverse thrust;
    a core engine drivingly connected to the fan section; and
    a core casing enclosing the core engine and at least partially defining a primary air flowpath through the core engine, the core casing extending along the central axis from a forward end to an aft end, the core casing defining an annular inlet to the primary air flowpath at the forward end and a reverse flow passage extending through the core casing to the primary air flowpath to allow a flow of air into the primary air flowpath at a location forward of a low pressure compressor when the variable pitch fan blades generate a reverse thrust, wherein an inner surface exit is defined through an inner surface of the core casing and at least partially through a core strut forward of the low pressure compressor, and wherein the reverse flow passage further comprises:
an outer surface entrance defined through an outer surface of the core casing, wherein the outer surface entrance is defined aft of a bypass outlet guide vane and forward of at least a portion of the low pressure compressor.

12. The engine of claim 11, wherein the core engine comprises the low pressure compressor, a combustion section, and a turbine, wherein the compressor, the combustion section, and the turbine are arranged in serial flow order.

13. The engine of claim 11, wherein the engine further defines a circumferential direction, the engine further comprising:
a continuous fan casing extending along the circumferential direction about the fan blades and at least a portion of the core casing, wherein the continuous fan casing defines a bypass airflow passage between the continuous fan casing and the core casing.

14. The engine of claim 11, wherein the engine further defines a radial direction, wherein the core strut extends inward from the inner surface of the core casing along the radial direction, the core strut being positioned between the annular inlet and the inner surface exit along the central axis, the engine further comprising:
a fan exit stator vane extending inward from the inner surface of the core casing along the radial direction, the fan exit stator vane being positioned aft of the fan blades between the annular inlet and the core strut along the central axis.

15. The engine of claim 11, wherein the engine further defines a radial direction, wherein the core strut extends inward from the inner surface of the core casing along the radial direction, and wherein the bypass outlet guide vane extends outward from the outer surface of the core casing along the radial direction, wherein the bypass outlet guide vane is substantially aligned with the core strut along the central axis to form a rigid radial support line.

16. The engine of claim 11, wherein the reverse flow passage defines an arcuate flowpath through the core casing.

17. The engine of claim 11, further comprising:
an active control plate attached to the core casing to selectively block air through the reverse flow passage.

18. The engine of claim 11, wherein the engine further defines a circumferential direction, the engine further comprising:
a plurality of reverse flow passages spaced along the circumferential direction.

19. The engine of claim 18, wherein the core casing defines a continuous strip along the core casing between each reverse flow passage.

20. A method of operating a propulsion device having a fan section with a plurality of variable pitch fan blades for generating a forward thrust and a reverse thrust, a core engine drivingly connected to the fan section, and a core casing, the method comprising:
generating reverse thrust utilizing the fan section such that air flows through a reverse flow passage, wherein the reverse flow passage is defined through the core casing, and wherein the core casing encloses the core engine and at least partially defines a primary air flowpath through the core engine, the core casing extending along a central axis from a forward end to an aft end, the core casing defining an annular inlet to the primary air flowpath at the forward end, wherein the core casing has an inner surface and outer surface;
articulating an active control plate with an obstruction so as to remove the obstruction from the reverse flow passage, wherein the reverse flow passage defines an arcuate flowpath through the core casing, wherein the active control plate is positioned within and at least partially aft of the arcuate flowpath; and
delivering a portion of reverse airflow through the reverse flow passage defined by the core casing and extending from an outer surface entrance to an inner surface exit, wherein the inner surface exit is defined through the inner surface, wherein the inner surface exit is defined aft of a core strut and forward of a low pressure compressor, and wherein the outer surface entrance is defined through the outer surface, wherein the outer surface entrance is defined aft of a bypass outlet guide vane and forward of at least a portion of the low pressure compressor.

* * * * *